July 6, 1954
D. LEWIS ET AL
2,683,207
STRANDED WELDING ROD
Filed July 21, 1951
2 Sheets-Sheet 1
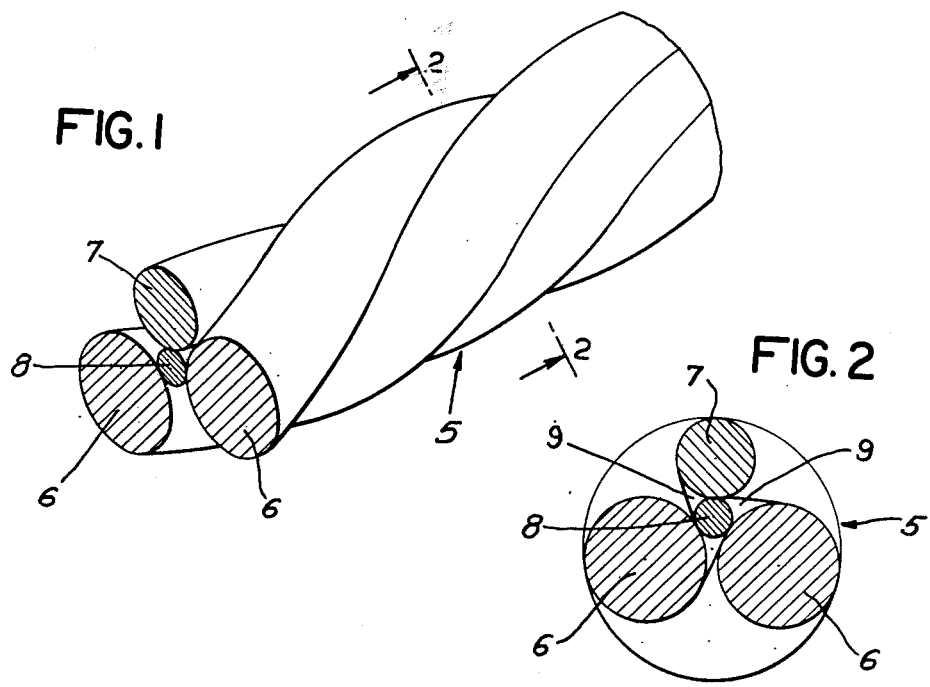
FIG. 1
FIG. 2
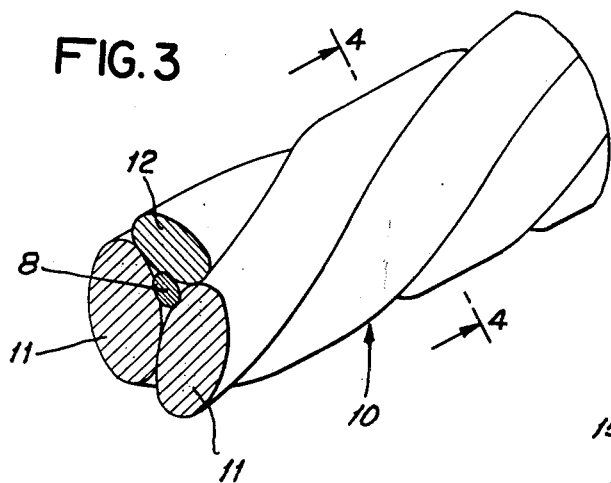
FIG. 3
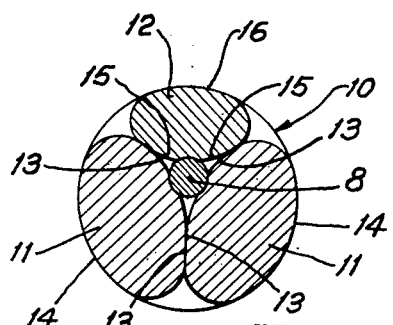
FIG. 4
INVENTORS.
DARTREY LEWIS
HOWARD F. STIRN
BY *W. P. Churchill*
ATTORNEY.

Patented July 6, 1954

2,683,207

UNITED STATES PATENT OFFICE 2,683,207

STRANDED WELDING ROD

Dartrey Lewis, Trenton, N. J., and Howard F. Stirn, Yardley, Pa., assignors, by mesne assignments, to John A. Roebling's Sons Corporation, Trenton, N. J., a corporation of Delaware Application July 21, 1951, Serial No. 237,918

7 Claims. (Cl. 219—8)

This invention relates to stranded wire rods and more particularly to rods of this character that are adapted to be advantageously employed in carrying out welding procedures.

Among the better known and extensively used welding procedures heretofore developed is the Aircomatic process which may be defined as an inert-gas-shielded metal-arc welding process. This process utilizes a consumable welding electrode and in this respect differentiates over inert-gas-shielded welding processes which use non-consumable electrodes, such as tungsten.

The Aircomatic process is characterized by creating an inert-gas-shielded arc between the workpiece and a consumable electrode through which metal is transferred to the workpiece where it becomes a part of the joint. The inert gas may be argon, helium or mixtures thereof, depending upon the material of the workpiece and the composition of the consumable electrode. In carrying out the process, the consumable electrode and inert gas are carried to a manually operated welding gun or to an automatic head from whence they are fed and discharged, respectively, as required. Where a welding gun is employed, the inert gas and electrode are carried to the gun through a flexible tube. This tube is usually relatively long and, for this reason, the electrode must possess requisite characteristics of stiffness and flexibility which enable it to be advanced, by pushing, through the tube during the welding operation.

The Aircomatic type process may be readily employed to obtain satisfactory welds in various metallic items, including aluminum-bronze items, such as aluminum-bronze ship rudders or screws, aircraft propellers, and the like. For best results, consumable electrodes used in welding aluminum-bronze items should have a composition comprising a major percentage of copper and minor percentages of aluminum and iron, by weight. The iron in the electrode serves as a grain refiner and tends to harden and strengthen the metal of the weld. Composite electrodes of this type, presently employed, have consisted for the most part of cast rods. These cast rods are, however, expensive and may be made only in relatively short lengths.

With the view of lowering the cost of the consumable electrodes, experimental aluminum-bronze electrodes have been made by twisting separate copper, aluminum and iron wires to obtain composite strands. In these electrodes, the various wires, including the iron wire, were on the outside of the twisted strands and therefore exposed to melting. Such electrodes have been unsatisfactory for two principal reasons. First, the iron wire, by virtue of its relatively small size, burned back from the arc in practice and, hence, its major effectiveness was lost. Secondly, these electrodes do not possess requisite stiffness to enable them to be properly fed through the welding gun.

We have discovered that composite rods made of a plurality of wires helically formed about a wire core of a different composition are eminently satisfactory for use as consumable electrodes. In our electrodes, the core consists of the most readily meltable wire of the wires employed. This wire, by virtue of its being surrounded and protected by the other wires, melts at the same rate as the other wires in practice. The expression "most readily meltable wire" is intended to mean the wire in our electrode that melts most readily during a welding operation and not necessarily the wire having the lowest melting point. For example, a fine iron wire will melt more quickly in an electric arc than a considerably larger copper or aluminum wire, despite the fact that iron has a higher melting point than either copper or aluminum.

Our electrodes may be manufactured at considerably lower cost than comparable cast rod electrodes of like composition. In the case of aluminum-bronze electrodes, the iron wire constitutes the core while the copper and aluminum wires form a sheath about the core. Electrodes, thus formed, are uniformly consumed in the welding procedure. The iron core, which constitutes the smallest wire of the composite strand, by virtue of its location, melts at the same rate as the copper and aluminum wires, thereby eliminating burning back of the iron relative to the remainder of the strand.

A stranded consumable welding electrode of this invention is produced by forming about a wire core a sheath comprising a plurality of helically formed wires to obtain a composite strand. In the case of an aluminum-bronze electrode, the core preferably consists of a single iron wire while the sheath preferably consists of a pair of copper wires and a single aluminum wire. There are instances in which it is desirable that the welding electrode have a substantially uniform diameter and a relatively smooth outer surface to enable it to be fed properly from a spool, through the welding unit tubing, and thence to the welding head. We find that this may be readily accomplished by swaging the composite strand. The swaging operation also has the effect of materially reducing or substantially eliminating the internal voids on the composite strand, depending on the relative size of the sheath and core wires.

The primary object of the invention is to produce a satisfactory stranded consumable welding rod.

Another object of the invention is to provide a stranded welding rod that may be readily manufactured at a considerably lower cost than conventional cast welding rods of like composition.

A further object of the invention is to provide a welding rod of the character indicated that is capable of performing its intended functions in an efficient and dependable manner.

The foregoing objects, together with the advantages of the invention, will be readily understood by persons skilled in the art upon reference to the detailed description that follows, taken in conjunction with the accompanying drawings.

In the drawings:

Fig. 1 is an isometric view of a stranded welding rod made in accordance with the invention;

Fig. 2 is a transverse cross-sectional view taken along line 2—2 of Fig. 1;

Figure 5:
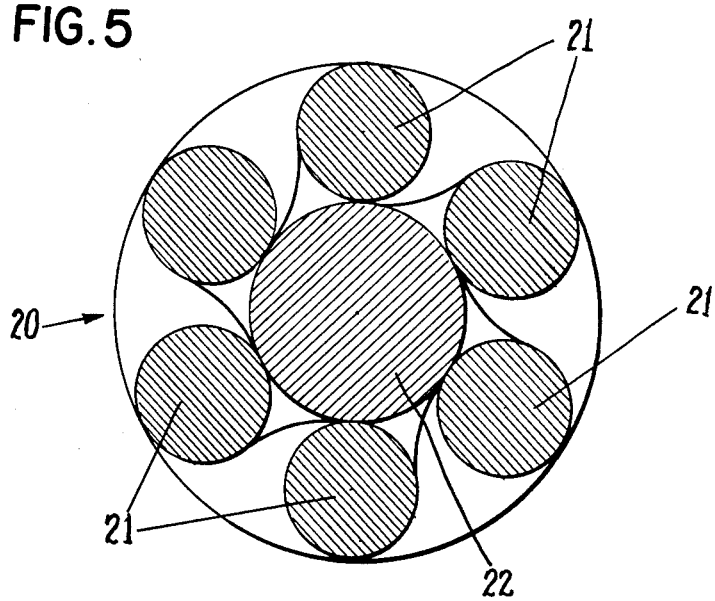
Figure 6:
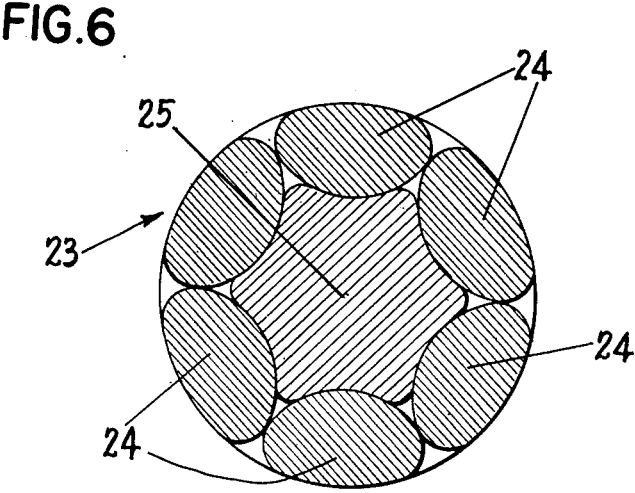

Fig. 3 corresponds to Fig. 1 and illustrates the welding rod thereof after swaging;

Fig. 4 is an enlarged, transverse cross-sectional view taken along line 4—4 of Fig. 3;

Fig. 5 is a transverse cross-sectional view, corresponding to Fig. 2, of another stranded welding rod made in accordance with the invention; and Fig. 6 is a view corresponding to Fig. 4 and illustrating the rod of Fig. 5 in transverse cross-section after swaging.

Referring now to the drawings and more particularly to Figs. 1 and 2, we have shown therein a composite strand 5 consisting of a pair of copper wires 6 and an aluminum wire 7 that are helically formed about an iron wire 8. The helically formed copper and aluminum wires may be considered as constituting a sheath, while the iron wire serves as a core that is wholly within and coextensive in length with the sheath. The wires define a series of inner helical openings 9 and similar outer helical openings (unnumbered). As will be noted from an examination of Fig. 2, iron wire 8 is considerably smaller in diameter than any of the other wires.

Composite strand 5, as shown, is satisfactory for welding purposes generally. It is desirable, in certain instances, to make the welding rod uniform in diameter and to provide a smooth surface thereon. We find that this may be readily accomplished by swaging the composite strand 5 of Figs. 1 and 2. In addition to obtaining a smooth outer surface and uniform outer diameter, the product is considerably stiffer and firmer than if swaging is omitted.

In Figs. 3 and 4, numeral 10 denotes the electrode rod obtained by swaging composite strand 5. This rod is substantially circular in cross section (Fig. 4) and has a relatively smooth outer surface. As a result of the swaging, the copper and aluminum wires are deformed and are represented by numerals 11 and 12, respectively, in Figs. 3 and 4. The iron core wire is not appreciably affected by the swaging operation and, accordingly, remains substantially circular in cross section.

As shown in Fig. 4, each copper wire 11 and aluminum wire 12 has the general configuration of a sector of a circle in transverse cross section. Each copper sector has a pair of inner sides 13 and an outer side 14, while the aluminum sector has a pair of inner sides 15 and an outer side 16. A substantial part of each sector inner side, as illustrated, merges and coincides with a corresponding part of an inner side of the next adjacent sector.

We find that rod 10 may be made in any desired length and may be wound about a spool or reel, from whence it is fed to the welding head, as required.

The above described electrode, whether in the form of composite strand 5 or rod 10, may be advantageously used in the welding of aluminum-bronze items; and, for satisfactory results, may have the following range of compositions:

| | Per cent |
|---|---|
| Iron | 0.8 to 3.3 |
| Aluminum | 9.6 to 14.7 |
| Copper | 89.6 to 82.0 |

Excellent results are obtainable in the welding of aluminum-bronze items with electrode rods of this invention having the following approximate compositions:

| | Per cent |
|---|---|
| Iron | 1 |
| Aluminum | 10 |
| Copper | 89 |

The copper component may be made of standard electrical grade, hard-drawn copper wires, the aluminum component may be made of a hard-drawn aluminum wire containing approximately 1% magnesium, while the iron component may be made of a steel wire containing a maximum of .06% carbon.

This invention is applicable to the manufacture of electrodes other than aluminum-bronze electrodes, including copper-lead-tin electrodes, wherein a plurality of copper wires constitute the sheath and a lead-tin alloy wire serves as the core. In electrodes of this character, the material of the sheath wires, namely copper, has a higher melting point than that of the lead-tin core wire. One such electrode that has been found satisfactory consisted of 14.5% lead, 7% tin and 78.5% copper.

Fig. 5 illustrates a stranded copper-lead-tin electrode prior to swaging, while Fig. 6 illustrates the same electrode after it has been swaged.

Referring to Fig. 5, we have shown therein a composite strand 20 consisting of a plurality of copper wires 21 that are helically formed about a lead-tin alloy wire, which is considerably larger in diameter than any of wires 21. The helically formed copper wires constitute a sheath, while the lead-tin alloy wire serves as a core that is wholly within and coextensive in length with the sheath.

Composite strand 20 may, as in the case of the earlier described embodiment of the invention, be swaged in order to obtain a smooth outer surface and uniform outer diameter, and to the end that the product may be stiffer than if swaging were omitted.

In Fig. 6, numeral 23 denotes the electrode rod obtained by swaging rod 20. As a result of the swaging, the copper wires are deformed and are identified by numeral 24, in Fig. 6. The lead-tin alloy core wire is also deformed so as to at least partially fill the voids previously existing between it and the sheath wires and is identified by numeral 25 in Fig. 6.

It is to be borne in mind that other arrangements of wires may be devised embodying the features of this invention, and, for this reason, we do not limit ourselves to the particular welding electrodes shown in the drawings. Nor do we limit ourselves to electrodes having particular compositions as it will be apparent that the instant method has wider application than to the manufacture of aluminum-bronze and copper-lead-tin electrodes. Further, while the consumable welding electrode of this invention is useful in carrying out the Aircomatic welding process, it may, if desired, be used with other welding processes of that general character.

We claim:

1. In a consumable welding electrode, a sheath comprising a plurality of helically formed wires and a wire core wholly within and coextensive with the sheath, said sheath wires being of compositions having lower melting points than the core wire, said core wire being of a reduced size such that the sheath wires and the core wire will be consumed at a substantially equal rate.

2. In a consumable welding electrode, a sheath comprising a plurality of helically formed wires and a wire core wholly within and coextensive with the sheath, said sheath wires being of compositions having lower melting points than the core wire, said core wire being of a reduced size such that the sheath wires and the core wire will be consumed at a substantially equal rate, the transverse cross-sectional configuration of the electrode being such that the core constitutes the center thereof and each sheath wire has the general shape of a sector, each sector comprising a pair of inner sides and an outer side, at least a part of each sector inner side being coincident with a part of an inner side of the next adjacent sector.

3. In a consumable welding electrode, a sheath consisting of a plurality of helically formed wires and a core consisting of a single wire wholly within and coextensive with the sheath, said sheath wires being of compositions having lower melting points than the core wire, said core wire being of a reduced size such that the sheath wires and the core wire will be consumed at a substantially equal rate.

4. In a consumable welding electrode, a sheath consisting of a plurality of helically formed wires and a core consisting of a single wire wholly within and coextensive with the sheath, said sheath wires being of compositions having lower melting points than the core wire, said core wire being of a reduced size such that the sheath wires and the core wire will be consumed at a substantially equal rate, the transverse cross-sectional configuration of the electrode being such that the core constitutes the center thereof and each sheath wire has the general shape of a sector, each sector comprising a pair of inner sides and an outer side, at least a part of each sector inner side being coincident with a part of an inner side of the next adjacent sector.

5. In a consumable welding electrode, a sheath consisting of a plurality of helically formed non-ferrous wires comprising a copper wire and an aluminum wire, and a single iron wire core wholly within and coextensive with the sheath, said sheath wires being of compositions having lower melting points than the core wire, said core wire being of a reduced size such that the sheath wires and the core wire will be consumed at a substantially equal rate.

6. In a consumable welding electrode, a sheath comprising a plurality of helically formed wires and a wire core wholly within and coextensive with the sheath, said sheath wires being of compositions having higher melting points than the core wire, said core wire being of increased size such that the sheath wires and the core wire will be consumed at a substantially equal rate.

7. In a consumable welding electrode, a sheath comprising a plurality of helically formed wires and a wire core wholly within and coextensive with the sheath, said sheath and core wires being of compositions having different melting points, the sizes of said wires being such that the sheath wires and the core wire will be consumed at a substantially equal rate.

References Cited in the file of this patent

UNITED STATES PATENTS

| Number | Name | Date |
| --- | --- | --- |
| 1,277,639 | Pescatore | Sept. 3, 1918 |
| 1,361,269 | Mattice | Dec. 7, 1920 |
| 1,437,257 | Mattice | Nov. 28, 1922 |
| 1,756,972 | Conner | May 6, 1932 |